United States Patent [19]

Clarke

[11] 4,128,319
[45] Dec. 5, 1978

[54] COVER PLATE FOR A MICROFORM READER

[75] Inventor: Ernest J. Clarke, London, England

[73] Assignee: NCR Corporation, Dayton, Ohio

[21] Appl. No.: 831,566

[22] Filed: Sep. 8, 1977

[30] Foreign Application Priority Data

Mar. 9, 1977 [GB] United Kingdom ............... 09865/77

[51] Int. Cl.² .......................... G03B 23/08; G03B 1/48
[52] U.S. Cl. .................................... 353/27 R; 353/23
[58] Field of Search ....................... 353/22, 23, 24, 27, 353/74, 75, 76, 77, 78, 95, 96

[56] References Cited

U.S. PATENT DOCUMENTS

| 2,353,241 | 7/1944 | Hughey | 353/23 |
|---|---|---|---|
| 3,352,201 | 11/1967 | Brownscombe | 353/27 R |
| 3,413,061 | 11/1968 | Simpson et al. | 353/23 |
| 3,424,524 | 1/1969 | Akiyama et al. | 353/27 R |
| 3,442,581 | 5/1969 | Smitzer et al. | 353/27 R |
| 3,733,121 | 5/1973 | Smitzer | 353/27 R |
| 3,743,399 | 7/1973 | Smith | 353/23 |
| 3,836,242 | 9/1974 | Kluver et al. | 353/27 R |
| 3,837,738 | 9/1974 | Kato et al. | 353/23 |
| 4,025,175 | 5/1977 | Leibundgut et al. | 353/27 R |

Primary Examiner—Richard E. Aegerter
Assistant Examiner—John W. Shepperd
Attorney, Agent, or Firm—J. T. Cavender; Albert L. Sessler, Jr.; Elmer Wargo

[57] ABSTRACT

A cover plate for a microform reader. The reader includes a carrier for holding a microform, with the cover plate being pivotally mounted on the carrier for movement between open and closed positions. A spring interconnects the cover plate and the carrier and coacts with an inclined surface in the reader to progressively add energy to the spring as the carrier is moved to a first position from a second position to enable the spring to automatically lift the cover plate as the carrier is moved towards the first position to permit the removal and insertion of a microform in the carrier.

6 Claims, 4 Drawing Figures

COVER PLATE FOR A MICROFORM READER

BACKGROUND OF THE INVENTION

This invention relates to viewing devices in general, and more particularly to a cover plate associated with a carrier in which a micro-image transparency is mounted for viewing within the reader. Hereinafter, a transparency carrying a plurality of micro-images will be referred to as a microform.

In general, microform readers of the type to which this invention applies include a microform carrier incorporating a cover plate for holding a microform in the carrier, the assembly of the carrier and the microform being movable relative to the projection lens assembly in order to bring a selected micro-image into alignment with the projection lens assembly for the purpose of displaying the desired image. The cover plate is liftable relative to a microform support portion of the carrier in order to enable a microform to be inserted into, or removed from, the carrier.

In a known microform reader of the kind specified, the cover plate is pivotably connected to the microform support portion of the carrier by means of a pivot rod, and the projection lens assembly is urged by means of a spring into contact with the upper surface of the cover plate, the arrangement being such that, in order to lift the cover plate, the carrier is moved forwardly relative to the projection lens assembly until the carrier reaches a point at which the projection lens assembly is behind the pivot rod, whereupon the cover plate is pivoted upwardly to an open position under the action of the spring-biased projection lens assembly.

This known microform reader has certain disadvantages. For example, the pivotal opening movement of the cover plate is a sudden movement and is therefore noisy. Further, each time the microform carrier is moved to a forward position to lift the cover plate, the position of the projection lens assembly is disturbed, thereby tending to give rise to focusing problems. Moreover, with the carrier in its forwardmost position, there is a risk of the cover plate being broken due to accidental depression thereof, since such depression of the cover plate is against the weight of the projection lens assembly.

SUMMARY OF THE INVENTION

This invention relates to a cover plate for a viewing device such as a microform reader which reader comprises a carrier for holding a microform, an optical or a projection system including a projection lens, and means for indexing the carrier along mutually perpendicular directions relative to the projection lens for displaying a selected image from a record medium such as a microform carried by the carrier in the projection system. The carrier is moveable between first and second positions and has the cover plate pivotally mounted thereon for movement between open and closed positions. A resilient means interconnects the cover plate and the carrier, and means for progressively adding energy to the resilient means as the carrier is moved towards the first position enables the resilient means to move the cover plate to the open position to enable a microform to be removed from or inserted into the carrier.

An advantage of this invention is that the cover plate is gently raised to the open position without any significant disturbance in the position of the projection lens and gently lowered to a closed position without disturbing a microform located in the carrier.

Another advantage of this invention is that it is very quiet in operation due to the gentle opening and closing of the cover plate; this is especially beneficial when several such readers are operated in the same room.

These and other advantages will become more readily apparent from the following description, claims, and drawing.

DETAILED DESCRIPTION OF THE INVENTION

Figure 1:
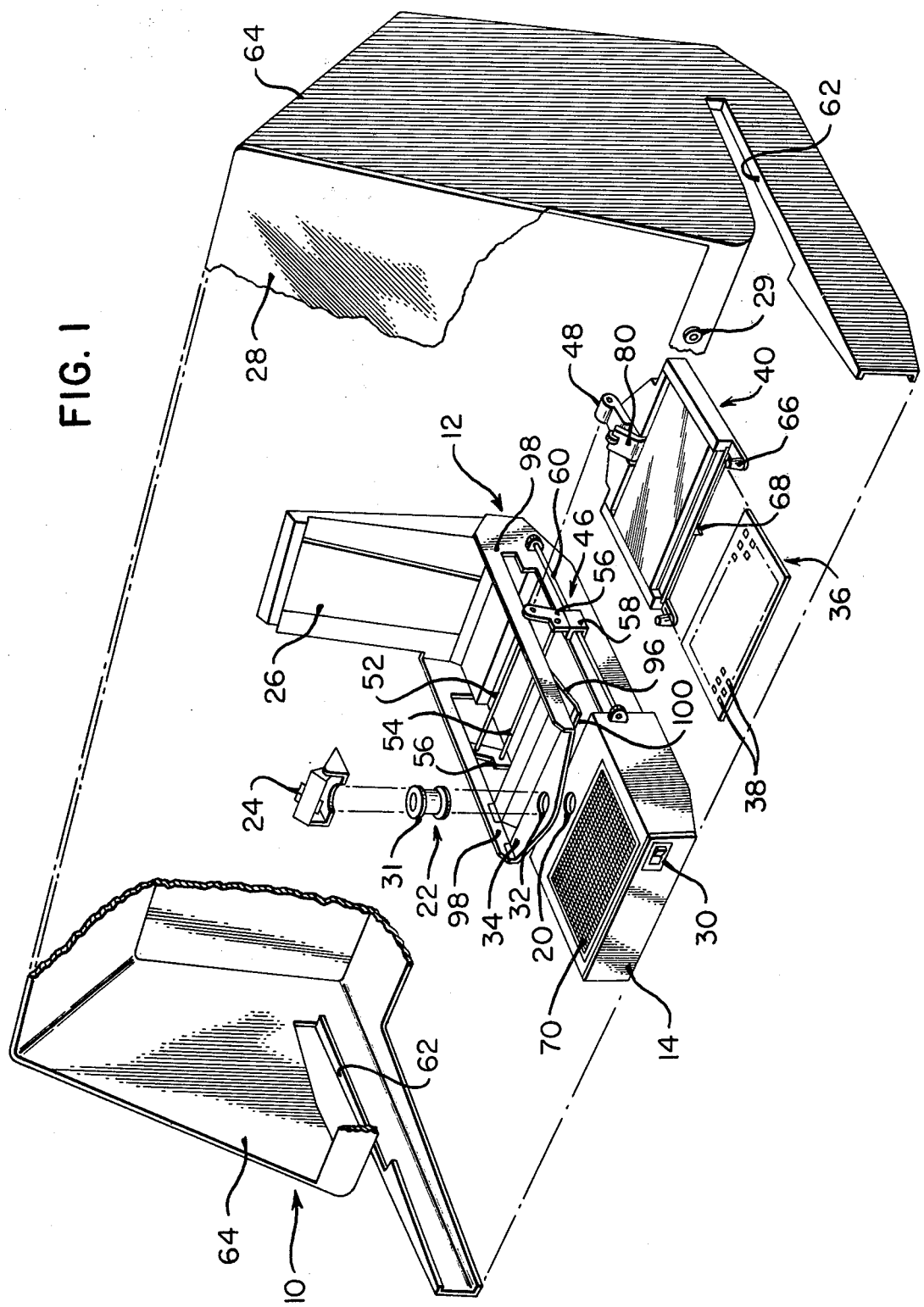
FIG. 1 is an exploded perspective view, shown partly broken away, of a microform reader in accordance with the invention.

Referring to the drawing, a preferred embodiment of a viewing device such as a microform reader of this invention includes housing 10 in which is mounted a support structure 12 for various operational elements of the reader. The support structure 12 incorporates an enclosure 14 in which are housed a light source 16, a reflector 17 and a condenser lens assembly 18; these being diagrammatically shown in FIGS. 3 and 4. The lens assembly 18 directs a light beam through an aperture 20 (FIG. 1) in the top of the enclosure 14 and through a projection lens assembly 22, the light beam being thence deflected by mirrors 24 and 26 (FIG. 4) onto a screen 28 at the front of the housing 10 for viewing by an operator. A focusing control knob 29 (FIG. 1) for the projection lens assembly 22 is mounted on the front of the housing 10, and a switch 30 for the light source 16 is provided on the front of the enclosure 14. The projection lens assembly 22 and the mirrors 24 and 26 are supported on the support structure 12 (FIG. 1), a central portion 31 of the projection lens assembly 22 fitting into an aperture 32 in a horizontal support plate 34 of the structure 12.

Figure 2:
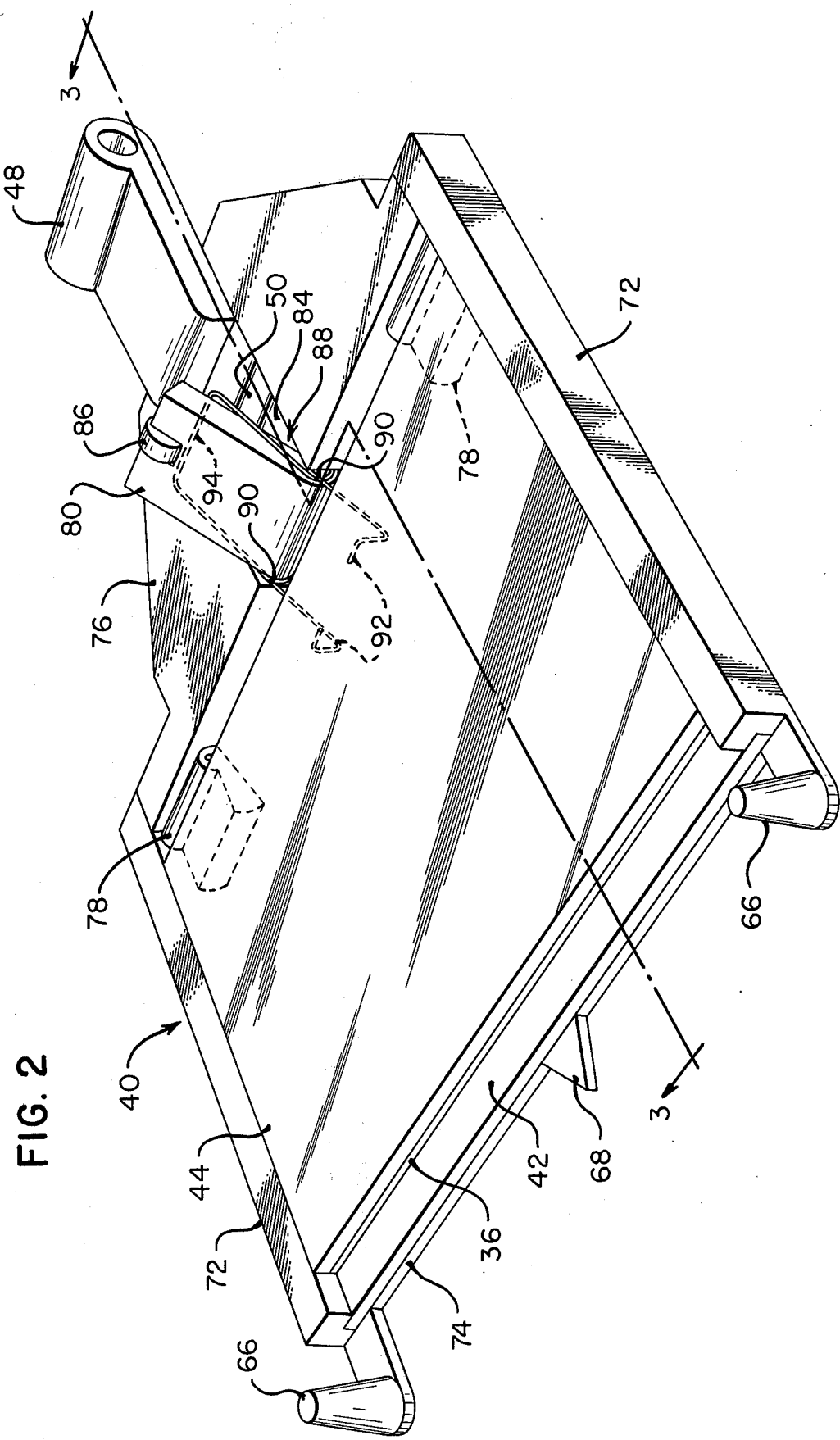
FIG. 2 is an enlarged perspective view of the microform carrier of the reader of FIG. 1.
Figure 3:
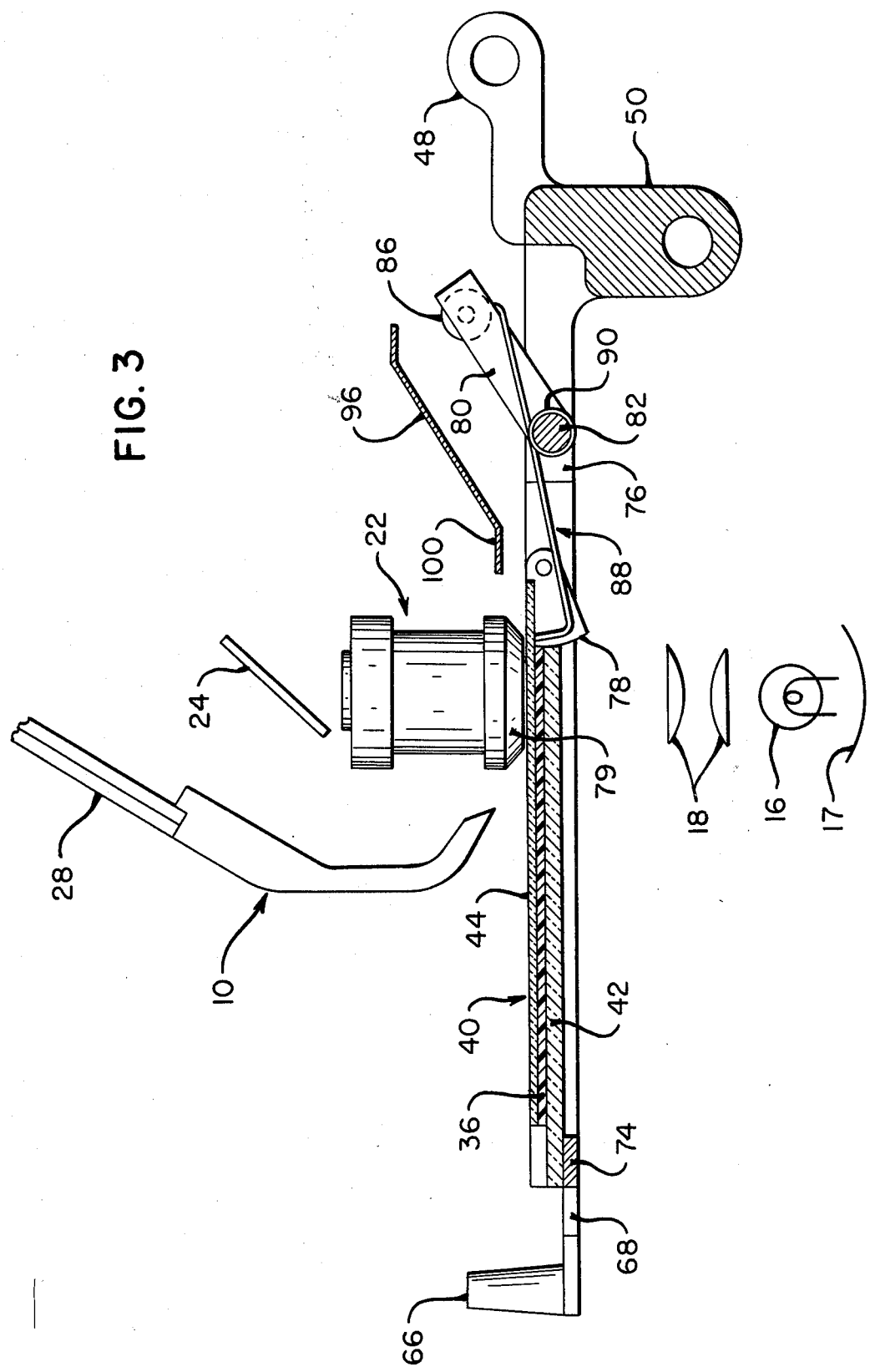
FIG. 3 is a diagrammatic, part-sectional side elevational view of part of the reader showing the microform carrier in a first position in which the cover plate is closed, the section being taken along the line 3—3 in FIG. 2.

A record member such as a microform 36 carrying a plurality of micro-images 38 (FIG. 1) is held in operation in a microform carrier 40 which is slidably mounted on the support structure 12, the microform 36 being normally held flat between a lower glass support plate 42 and a glass cover plate 44 as shown in FIG. 3. The carrier 40 is slidably mounted on carriage means 46 (FIG. 1) for side-to-side movement relative to the carriage means 46, the carrier 40 being provided with bushing or bearing means 48 and 50 which are respectively slidably mounted on shafts 52 and 54 extending transversely between side portions 56 of the carriage means 46. In turn, the carriage means 46 is slidably mounted on the support structure 12 for fore-and-aft movement relative to the structure 12, the carriage means 46 being provided with two bearing means 58 (only one of which is shown) which are respectively mounted on shafts 60 extending along opposite sides of the support structure 12 in a fore-and-aft direction. The carrier 40 is so mounted on the support structure 12 that it is free to pass between the top of the enclosure 14 and the support plate 34, and is also free to pass through slots 62 (FIG. 1) formed in the side walls 64 of the housing 10. It will be appreciated that, by virtue of the side-to-side movement of the carrier 40 relative to the carriage means 46 combined with the fore-and-aft movement of the carriage means 46 relative to the support structure 12, the carrier 40 is movable in any direction in a horizontal plane relative to the support structure 12. Such movement is brought about by means of handles 66 (FIGS. 1, 2 and 4) attached to the carrier 40. The position of the carrier 40 at any instant relative to the projection lens assembly 22 is indicated by a pointer 68 attached to the carrier 40, the pointer 68 co-operating with an index grid 70 (FIG. 1) provided on the upper surface of the enclosure 14.

As is most clearly shown in FIG. 2, the glass plates 42 and 44 are mounted in a generally rectangular framework of the carrier 40 comprising side portions 72, a front portion 74 to which the handles 66 and the pointer 70 are attached, and an extended rear portion 76 to which the bushing means 48 and 50 are attached, the upper surface of the portion 76 being coplanar with the upper surface of the cover plate 44 when the latter is in a closed position. The cover plate 44 is pivotably mounted on the side portions 72 by means of hinges 78 which are disposed to the rear of the support plate 42. In normal operation, the cover plate 44 is in a closed position, as shown in FIGS. 2 and 3, with its upper surface in sliding contact with a bearing ring 79 of the projection lens assembly 22, and with the microform 36 held flat between the support plate 42 and cover plate 44. When the microform 36 is in correct position in the carrier 40, its side edges respectively engage with the side portions 72 of the carrier 40, and its rear edge abuts against the hinges 78, the hinges 78 serving as stop means for the microform 36. An arm member 80 is pivotably mounted at one end on the carrier 40 by means of a shaft 82 (FIGS. 3 and 4), the shaft 82 extending across a recess 84 formed in the rear portion 76 of the carrier 40, and the arm member 80 being pivotable into and out of the recess 84. The arm member 80 carriers a nylon roller 86 at its free end. A torsion spring 88 is mounted on the carrier 40 in co-operative relationship with the cover plate 44 and with the arm member 80. First and second portions 90 of the spring 88 are wound around the shaft 82 on either side of the arm member 80, while the free ends 92 of the spring 88 bear against the underside of the cover plate 44, and the central portion 94 of the spring 88 bears against the underside of the arm member 80. As will be made clear later, the arm member 80 serves as a control means for the spring 88.

Figure 4:
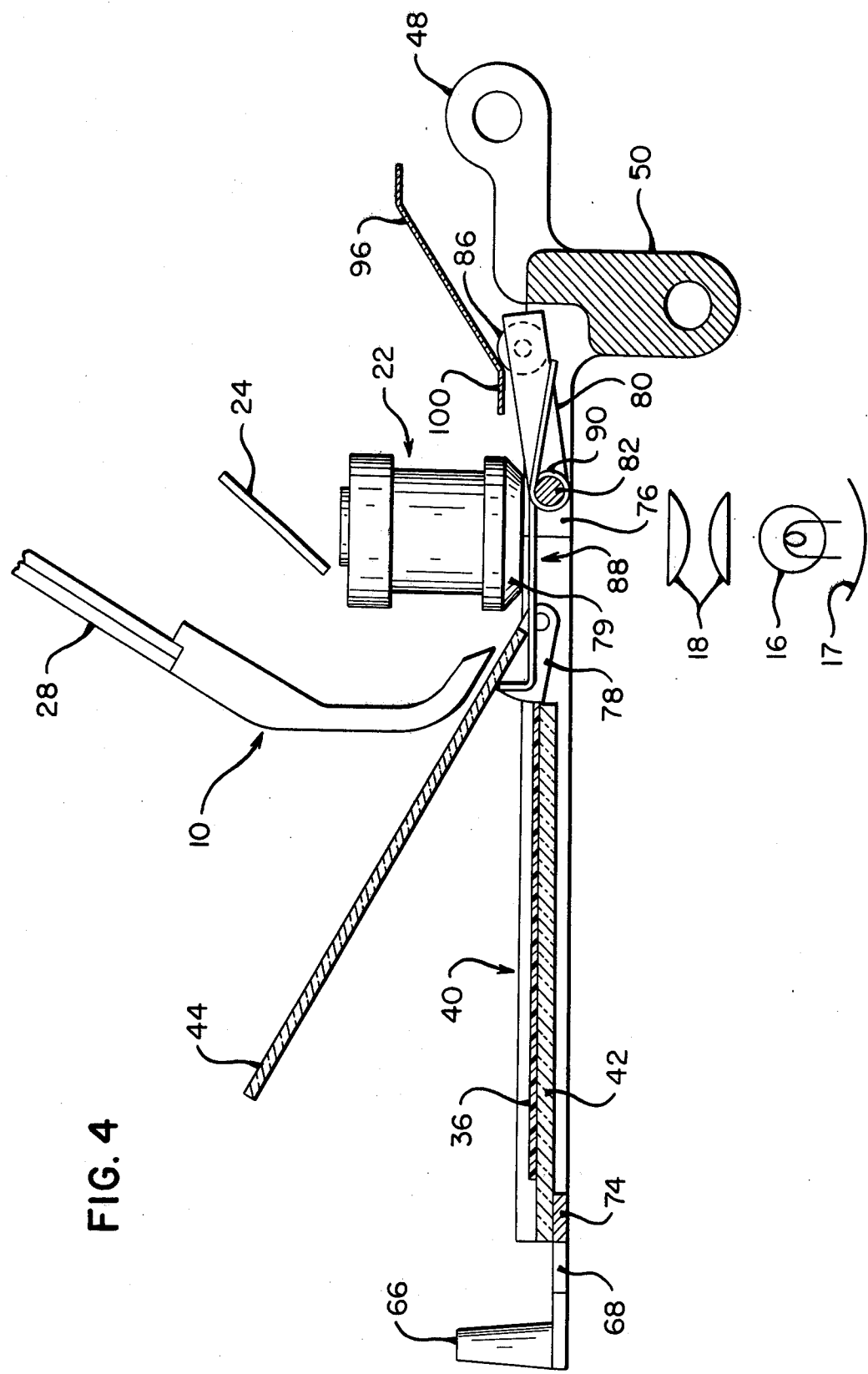
FIG. 4 is a view, similar to FIG. 3, showing the microform carrier in a second position in which the cover plate is open.

Referring now particularly to FIGS. 3 and 4, the roller 86 carried on the arm member 80 is arranged to make contact with the underside of an inclined member 96 during movement of the carrier 40 towards its forwardmost position, that is to say towards its leftmost position or a first position with reference to FIGS. 3 and 4, the member 96 being inclined with respect to this direction of movement. After making contact with the inclined member 96, the roller 86 is urged resiliently against it under the action of the spring 88. The member 96 is secured to, and extends between, two side arms 98 (FIG. 1) of the support structure 12. A horizontal plate 100, best shown in FIGS. 3 and 4, is provided contiguous with the lower end of the inclined member 96, the plate 100 also extending across the whole width of the support structure 12, as shown in FIG. 1.

The operation of the microform reader will now be described. Assuming that the microform 36 is correctly located in the carrier, then in order to display a selected image onto the screen 28, the carrier 40 is moved by the operator by means of the handles 66 until the appropriate micro-image 38 is aligned with the axis of the projection lens assembly 22, the cover plate 44 making sliding contact with the bearing ring 79 of the projection lens assembly 22 during such movement. It should be understood that for the whole of the time that part of the microform 36 is positioned beneath the center of the projection lens assembly 22, the roller 86 remains out of contact with the inclined member 96 with the spring 88 in an untensioned condition, this being the situation illustrated in FIG. 3.

When it is desired to remove the microform 36 from the carrier 40, the carrier is moved by the operator towards its forwardmost or first position in which it is accessible by the operator, this movement being from right to left with reference to FIGS. 3 and 4. During this forward movement, the rear edge of the microform 36 is moved past the axis of the projection lens assembly 22. Immediately thereafter, the roller 86 makes contact with the inclined member 96 and rides down the member 96 as the carrier 40 continues to move forwards, thereby causing the arm member 80 to pivot in a clockwise direction (with reference to FIGS. 3 and 4) about the shaft 82. This pivotal movement of the arm member 80 serves to tension the spring 88, and, shortly before the roller 86 reaches the lower end of the inclined member 96, the tension built up in the spring 88 becomes sufficiently great to overcome the weight of the cover plate 44 and thereby causes this plate to pivot gently in a clockwise direction into its open position, this being the situation illustrated in FIG. 4. It should be understood that, prior to the plate 44 commencing to pivot open, the upper surface of the rear portion 76 of the framework of the carrier 40 moves into sliding contact with, and supports, the projection lens assembly 22, so that the position of the assembly 22 is not disturbed. In this connection, it should be noted that the diameter of the bearing ring 79 of the projection lens assembly 22 is greater than the width of the recess 84 (FIG. 2) in the portion 76 of the carrier 40, and that the arm member 80 is moved into the recess 84 out of the path of the assembly 22 during movement of the carrier 40 towards its forwardmost position. When the carrier 40 has reached its forwardmost position, the roller 86 is in contact with the horizontal plate 100 provided at the lower end of the inclined member 96, and with the roller 86 in this position, the cover plate 44 remains in its open position, so that the microform 36 can be readily removed by the operator.

After the microform 36 has been removed, a new microform can be inserted into the reader by placing the microform on the support plate 42 with its rear edge abutting against the hinges 78. The carrier 40 is then moved backwards or to the right as viewed in FIG. 4 by the operator, and during this movement, the roller 86 rides back up the inclined member 96, thereby allowing the spring 88 to unwind until the tension therein is sufficiently low to allow the cover plate 44 to pivot gently back to its closed position with the new microform held in the correct position between the plates 42 and 44. Backward movement of the carrier 40 continues until the roller 86 is moved out of contact with the inclined member 96, and the projection lens assembly 22 is again positioned over the microform.

It is found that the microform reader described above has the advantage that it is very quiet in operation, by virtue of the gentle opening and closing movements of the cover plate 44. This advantage is of particular significance when a plurality of readers is operated at the same time in the same room. The gentle closing movement of the cover plate 44 has the additional advantage that there is little likelihood of the position of the microform on the support plate 42 being disturbed due to forced air as the cover plate 44 is closed. A further advantage of the reader described above is that there is substantially no disturbance of the position of the projection lens assembly 22 during movement of the carrier 40 to its forwardmost position, so that focusing problems are alleviated. Moreover, with this reader the risk of glass breakage during replacement of a microform is virtually eliminated since when the glass cover plate 44 is in its open position it can be pressed down freely against the pressure of the spring 88.

What is claimed is:

1. A viewing device comprising:
   a carrier for holding a record member to be viewed;
   an optical system;
   means for indexing said carrier relative to said optical system for displaying a selected portion of a record member carried by said carrier in said optical system;
   said carrier being moveable between first and second positions and having cover means thereon with means for pivotally mounting said cover means on said carrier for movement between open and closed positions;
   a resilient means for interconnecting said cover means and said carrier to enable said resilient means to move said cover means to said open position when a predetermined amount of energy is added to said resilient means;
   means for adding energy to said resilient means to progressively store energy therein as said carrier is moved towards said first position to enable said resilient means to move said cover means towards said open position as said carrier is moved towards said first position and
   means for mounting said resilient means on said carrier, said resilient means having a first portion to engage said means for adding energy and a second portion to enage said cover means.

2. A viewing device comprising:
   a carrier for holding a record member to be viewed;
   an optical system;
   means for indexing said carrier relative to said optical system for displaying a selected image from a record member carried by said carrier in said optical system;
   said carrier being moveable between first and second positions and having a cover plate thereon with means for pivotally mounting said cover plate on said carrier for movement between open and closed positions;
   a resilient means for interconnecting said cover plate and said carrier to enable said resilient means to move said cover plate to said open position when a predetermined amount of energy is added to said resilient means; and
   means for adding energy to said resilient means to progressively store energy therein as said carrier is moved towards said first position to enable said resilient means to move said cover plate towards said open position as said carrier is moved towards said first position;
   said means for adding energy to said resilient means comprising:
   an inclined surface; and lever means mounted on said carrier and engaging said inclined surface and said resilient means to add said energy to said resilient means as said carrier is moved towards said first position.

3. The device as claimed in claim 2 further comprising means for pivotally mounting said resilient means and said lever means on said carrier to travel therewith;
   said lever means having a free end having a roller mounted thereon;
   said resilient means being in the form of a torsion spring having first and second portions in cooperative relationship with said cover plate and said free end of said lever means respectively, whereby carrier movement from said second position to said first position causes said roller to engage said inclined surface to pivot said free end in a direction which progressively adds said energy to said torsion spring.

4. The microform reader as claimed in claim 3 in which said carrier has a support surface and said cover plate has an upper surface which is coplanar with said support surface when said cover plate is in said closed position;
   said projection lens bearing on said upper surface during said displaying of a selected image from said microform with said carrier being slidably moveable relative to said projection lens, whereby said projection lens moves into contact with said support surface prior to said cover plate being moved to said open position as said carrier is moved towards said first position.

5. The microform reader as claimed in claim 4 in which said carrier has a recess therein to receive said free end of said lever means as said carrier is moved towards said first position from said second position and said microform is positioned between said carrier and said cover plate, with said cover plate being moveable to said closed position against the bias of said torsion spring when said carrier is in said first position.

6. A microform reader comprising:
   a carrier for holding a microform;
   a projection system including a projection lens;
   a support structure;
   means for indexing said carrier relative to said support structure along mutually perpendicular directions relative to said projection lens for displaying a selected image from a microform carried by said carrier in said projection system;
   said carrier being moveable between frist and second positions relative to said support structure and having a cover plate with means for pivotally mounting said cover plate thereon for movement between open and closed positions;
   control means;
   a resilient means mounted on said carrier in cooperative relationship with said cover plate and said control means whereby said control means causes energy to be progressively stored in said resilient means as said carrier is moved from said second position towards said first position to enable said resilient means to move said cover plate to said open position as said carrier approaches said first position;

said control means comprising:

a cooperating inclined surface fixed to said support structure and being inclined with respect to the direction of movement of said carrier between said first and second positions; and a lever means and means for pivotally mounting said lever means on said carrier;

said lever means coacting with said inclined surface and said resilient means to cause said energy to be progressively stored in said resilient means as said carrier is moved from said second position towards said first position.

* * * * *